Figure 2:
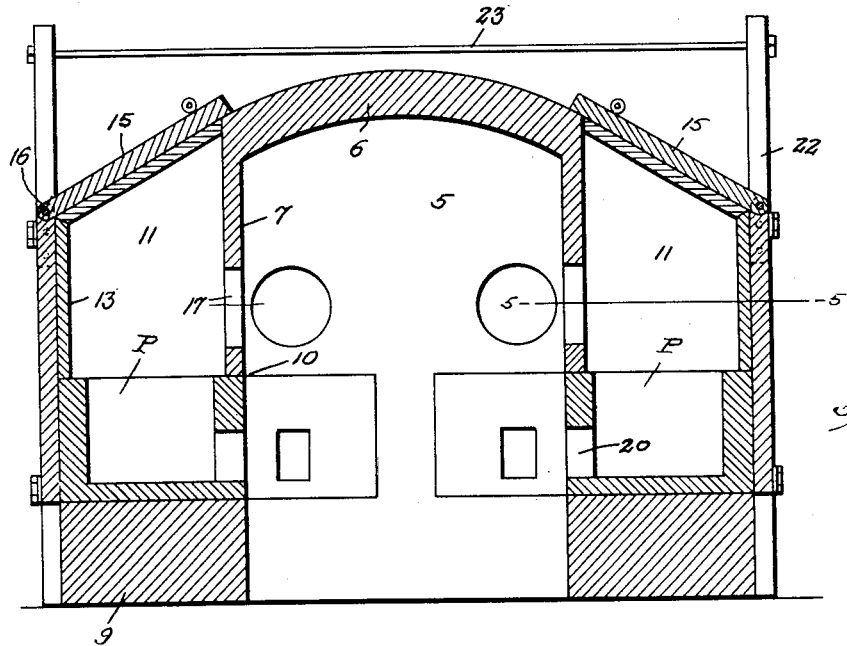

Dec. 13, 1927.
C. L. CLARK
1,652,608
GLASS TANK FURNACE
Filed May 13, 1927
2 Sheets-Sheet 1
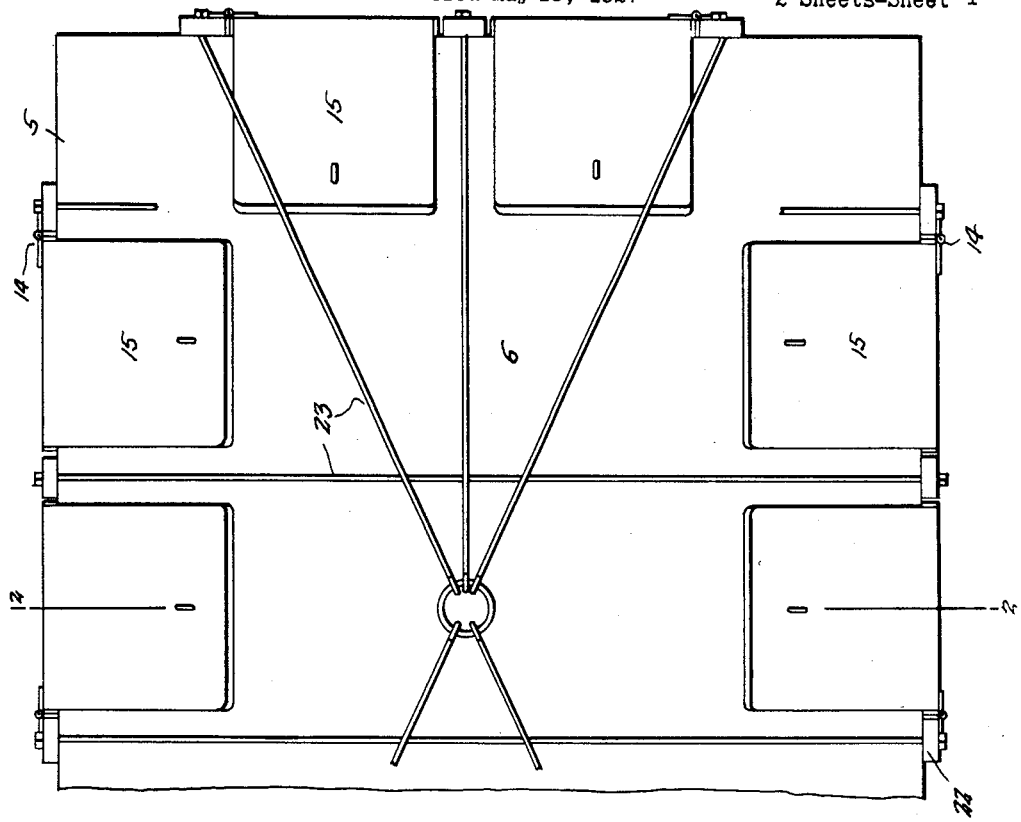
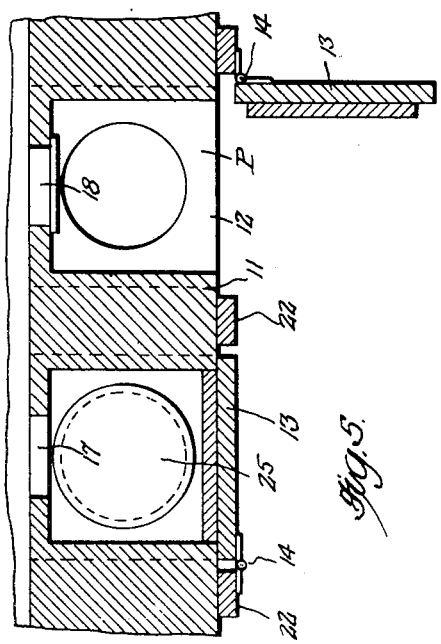
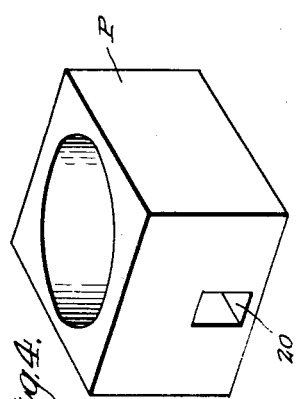
Inventor
C. L. Clark,
By Clarence A. O'Brien
Attorney Dec. 13, 1927.

C. L. CLARK 1,652,608

GLASS TANK FURNACE

Filed May 13, 1927 2 Sheets-Sheet 2

Inventor
C. L. Clark,

By Clarence A. O'Brien
Attorney

Patented Dec. 13, 1927.

1,652,608

UNITED STATES PATENT OFFICE.

CHARLES L. CLARK, OF BRIDGETON, NEW JERSEY.

GLASS-TANK FURNACE.

Application filed May 13, 1927. Serial No. 191,114.

The present invention relates to glass tanks, and more especially to the working out compartment of such tanks.

An important object of the invention is to provide working out compartments in which the molten galss is maintained at the proper consistency for drawing and blowing, so that a constantly maintained source of molten glass supply is had.

Another object of the invention lies in the provision of pots which are constructed and placed directly in the working end or nose of the furnace, the same being an improved structure of glass furnace and pots, thus enabling the glass to be taken directly from said pots which are placed within the furnace, thus preventing the accumulation of cold or chilled glass and all impurities.

A still further important object of the invention resides in the provision of an improved structure of this nature which is simple, inexpensive, strong and durable, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 3:
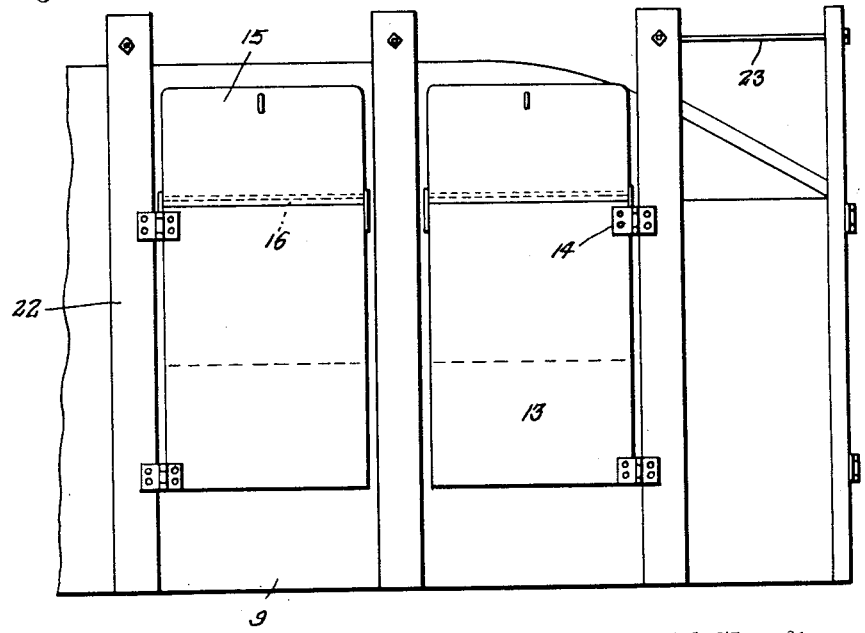

In the drawings:

Figure 1 is a top plan view of the structure embodying the features of this invention, Figure 2 is a vertical transverse section therethrough taken substantially on the line 2—2 of Figure 1, Figure 3 is a fragmentary side elevation thereof, Figure 4 is a perspective view of one of the pots, and Figure 5 is a horizontal detail section taken substantially on the line 5—5 of Figure 2.

Referring to the drawings in detail it will be seen that the numeral 5 denotes generally the working end or nose of the glass furnace comprising top 6, sides 7, and end wall 8. A base structure 9 is constructed about the nose portion 5 of the furnace to extend outwardly of the bottom thereof. The end and side walls are provided with openings 10 usually known as ring holes which are always closed when the furnace is in operation and open when the furnace is idle, the purpose being to keep the glass hot at the top of the pot by permitting the heat to come through the opening or ring hole when the furnace is not in operation, thereby preventing the glass remaining in the pots from becoming cold or chilled. A casing 11 is built about the base structure 9 and has openings 12 which are closed by doors each consisting of a lower section 13 hinged as at 14 and an upper section 15 hinged to the lower section as at 16 to close the top of the opening 12, the side and end walls are further provided with openings 17 which may receive plugs 18 as shown in Figure 5. Pots P are put in the various compartments formed in the casing 11 and have openings 20 leading into the interior of the nose or working end of the furnace 5.

The casing structure 11 is braced by vertical standards or bars 22, the upper ends of which are connected by rods 23 for properly bracing the structure in relation to each other. The lower sections 13 are preferably hinged to some of these standards 22 as is shown in Figure 3. Covers 25 are provided for the pots as is shown in Figure 5. The present method of blowing window glass is as follows: The glass is taken from the nose or working end of the furnace by hand, a man gathering the same with an iron ladle, then carried to the blowing machine and the glass transported to a pot, then taken up by machine and blown. Under the present method to complete the blowing it is necessary to have men carry the glass from the furnace to the pots, men to attend the pots, men to carry away waste glass, and there is a large percent of the glass of poor quality because when carrying the glass in the ladle it blisters and becomes stringy, also there is a percentage of glass wasted.

The advantages of the present invention are as follows: The blowing machine would be near or close to the working end or nose of the furnace, drawing the glass direct from the pot, which in this invention is part of the tank, thereby eliminating any waste, blisters or strings, resulting in a better quality of glass. The glass would not become chilled by contact with cold air. The pot is self-filling, also the glass remaining in the pot would be subjected to a uniform degree of heat. Everything considered reducing materially the overhead and cost of production. The cost of pots now in use approximately are $500.00 and they break easily, and it is necessary to replace same quite often. The pots used in this invention would not exceed $25.00 in cost because the same are made without skilled labor, therefore, in the cost of pots alone there would be an immense saving.

The door structure is also important as it enables the compartments of the casing about the nose structure to be closed when the pots are not being used, thereby effectively preventing the escape of heat. The plugs may be placed over the pots in the other section openings at 17.

It is thought that the construction, utility and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described the invention, what is claimed as new is:—

1. In combination, a glass furnace nose or working end having ring holes, a base built about the lower portion of the nose, a housing superimposed upon the base about the sides and end of the nose, pots in the housing communicating with the interior of the nose through the ring holes, openings being provided in the sides of the pots for this purpose, said housing being divided into a plurality of compartments, each compartment being formed with a side and upper opening, a door structure for closing said opening, each door comprising a lower section hinged to the housing and an upper section hinged to the lower section.

2. In combination, a glass furnace nose or working end having ring holes, a base built about the lower portion of the nose, a housing superimposed upon the base about the sides and end of the nose, pots in the housing communicating with the interior of the nose through the ring holes, opening being provided in the sides of the pots for this purpose, said housing being divided into a plurality of compartments, each compartment being formed with a side and upper opening, a door structure for closing said opening, each door comprising a lower section hinged to the housing and an upper section hinged to the lower section, bars extending vertically of the housing, and rods connecting the upper ends of the bars together.

3. In combination, a glass furnace nose or working end having ring holes, a base built about the lower portion of the nose, a housing superimposed upon the base about the sides and end of the nose, pots in the housing communicating with the interior of the nose through the ring holes, openings being provided in the sides of the pots for this purpose, said housing being divided into a plurality of compartments, each compartment being formed with a side and upper opening, a door structure for closing said opening, each door comprising a lower section hinged to the housing and an upper section hinged to the lower section, bars extending vertically of the housing, and rods connecting the upper ends of the bars together, said nose being provided in its sides and end with openings above the pots leading into the compartments.

4. In combination, a glass furnace nose or working end having ring holes, a base built about the lower portion of the nose, a housing superimposed upon the base about the sides and end of the nose, pots in the housing communicating with the interior of the nose through the ring holes, openings being provided in the sides of the pots for this purpose, said housing being divided into a plurality of compartments, each compartment being formed with a side and upper opening, a door structure for closing said opening, each door comprising a lower section hinged to the housing and an upper section hinged to the lower section, bars extending vertically of the housing, and rods connecting the upper ends of the bars together, said nose being provided in its sides and end with openings above the pots leading into the compartments, plugs for the pots and plugs for the last mentioned openings.

In testimony whereof I affix my signature.

CHARLES L. CLARK.